(12) United States Patent
Rouhani et al.

(10) Patent No.: US 11,651,260 B2
(45) Date of Patent: May 16, 2023

(54) HARDWARE-BASED MACHINE LEARNING ACCELERATION

(71) Applicant: The Regents of the University of California, Oakland, CA (US)

(72) Inventors: Bita Darvish Rouhani, San Diego, CA (US); Mohammad Ghasemzadeh, San Diego, CA (US); Farinaz Koushanfar, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 638 days.

(21) Appl. No.: 16/481,816

(22) PCT Filed: Jan. 31, 2018

(86) PCT No.: PCT/US2018/016136
§ 371 (c)(1),
(2) Date: Jul. 29, 2019

(87) PCT Pub. No.: WO2018/144534
PCT Pub. Date: Aug. 9, 2018

(65) Prior Publication Data
US 2020/0027016 A1    Jan. 23, 2020

Related U.S. Application Data

(60) Provisional application No. 62/452,880, filed on Jan. 31, 2017.

(51) Int. Cl.
*G06N 20/00* (2019.01)
*G06N 7/00* (2023.01)
(Continued)

(52) U.S. Cl.
CPC ............. *G06N 7/005* (2013.01); *G06F 17/16* (2013.01); *G06N 20/00* (2019.01); *G06N 20/10* (2019.01)

(58) Field of Classification Search
CPC ........ G06N 20/00; G06N 20/10; G06N 20/20; G06N 7/005; G06N 5/02; G06N 5/022; G06N 5/04; G06N 5/00
See application file for complete search history.

(56) References Cited

U.S. PATENT DOCUMENTS

| 9,477,925 B2 | 10/2016 | Seide et al. | |
| 2015/0055783 A1* | 2/2015 | Luo | H04S 5/00 |
| | | | 381/17 |

(Continued)

FOREIGN PATENT DOCUMENTS

WO    WO 2016/037351 A1    3/2016

OTHER PUBLICATIONS

Kim et al. "A Highly Scalable Restricted Boltzmann Machine FPGA Implementation", 2009 https://ieeexplore.ieee.org/abstract/document/5272262 (Year: 2009).*

(Continued)

*Primary Examiner* — Kamran Afshar
*Assistant Examiner* — Shoun J Abraham
(74) *Attorney, Agent, or Firm* — Mintz Levin Cohn Ferris Glovsky and Popeo, P.C.

(57) ABSTRACT

A method for hardware-based machine learning acceleration is provided. The method may include partitioning, into a first batch of data and a second batch of data, an input data received at a hardware accelerator implementing a machine learning model. The input data may be a continuous stream of data samples. The input data may be partitioned based at least on a resource constraint of the hardware accelerator. An update of a probability density function associated with the machine learning model may be performed in real time. The probability density function may be updated by at least processing, by the hardware accelerator, the first batch of data before the second batch of data. An output may be (Continued)

generated based at least on the updated probability density function. The output may include a probability of encountering a data value. Related systems and articles of manufacture, including computer program products, are also provided.

18 Claims, 9 Drawing Sheets

(51) Int. Cl.
  *G06F 17/16* (2006.01)
  *G06N 20/10* (2019.01)

(56) References Cited

U.S. PATENT DOCUMENTS

| | | |
|---|---|---|
| 2016/0350645 A1 | 12/2016 | Brothers et al. |
| 2016/0379111 A1 | 12/2016 | Bittner, Jr. et al. |
| 2017/0286864 A1 | 10/2017 | Fiedel et al. |

OTHER PUBLICATIONS

Dahl et al. "Training Restricted Boltzmann Machines on Word Observations", 2012 https://arxiv.org/pdf/1202.5695.pdf (Year: 2012).*
Dahl et al. "Phone Recognition with the Mean-Covariance Restricted Boltzmann Machine", 2010 http://citeseerx.ist.psu.edu/viewdoc/download?doi=10.1.1.224.1488&rep=rep1&type=pdf(Year: 2010).*
Farina "Algorithms for Real-Time Processing", 2002 https://citeseerx.ist.psu.edu/viewdoc/download?doi=10.1.1.128.2139&rep=rep1&type=pdf (Year: 2002).*
Neil et al. "Minitaur, an Event-Driven FPGA-Based Spiking Network Accelerator", 2014 https://ieeexplore.ieee.org/abstract/document/6701396 (Year: 2014).*
Asadi et al. "Reconfigurable Computing for Learning Bayesian Networks", 2008 https://dl.acm.org/doi/pdf/10.1145/1344671.1344702 (Year: 2008).*
Asadi, N. B. et al., "ParaLearn: A Massively Parallel, Scalable System for Learning Interaction Networks on FPGAs," *ICS*, 2010.
Asadi, N. B. et al., "Reconfigurable computing for learning Bayesian networks," in *FPGA*, 2008.
Bottolo, L. et al., "Evolutionary Stochastic Search for Bayesian model exploration," *Bayesian Analysis*, vol. 5, 2010.
Brooks, S. et al., *Handbook of Markov Chain Monte Carlo*. CRC press, 2011.
Byrd, J. M. et al., "Reducing the run-time of MCMC programs by multithreading on SMP architectures," *IPDPS*, 2008.

Chen, T. et al., "Stochastic Gradient Hamiltonian Monte Carlo." in *ICML*, 2014.
Flury, T. et al., "Bayesian inference based only on simulated likelihood: particle filter analysis of dynamic economic models," *Econometric Theory*, vol. 27, 2011.
Henriksen, S. et al., "Parallel Implementation of Particle MCMC methods on a GPU," *IFAC*, vol. 45, 2012.
Jacobsen, M. et al., "RIFFA 2.1: A reusable integration framework for FPGA accelerators," *TRETS*, vol. 8, 2015.
Laraway, S. A. et al., "Implementation of a Markov Chain Monte Carlo based Multiuser/MIMO Detector," *IEEE Transactions on Circuits and Systems I*, vol. 56, 2009.
Liu, S. et al., "An exact MCMC accelerator under custom precision regimes," *FPT*, 2015.
Liu, S. et al., "An unbiased MCMC FPGA-based accelerator in the land of custom precision arithmetic," *IEEE Transactions on Computers*, 2016.
Maclaurin, D. et al., "Firefly Monte Carlo: Exact MCMC with subsets of data," *arXiv preprint* arXiv:1403.5693, 2014.
Mingas, G. et al., "A custom precision based architecture for accelerating parallel tempering MCMC on FPGAs without introducing sampling error," in *FCCM*, 2012.
Mingas, G. et al., "On optimizing the arithmetic precision of mcmc algorithms," in *FCCM*, 2013.
Mingas, G. et al., "Population-Based MCMC on Multi-Core CPUs, GPUs and FPGAs," *IEEE Transactions on Computers*, vol. 65, 2016.
Neiswanger, W. et al., "Asymptotically exact, embarrassingly parallel MCMC," *arXiv preprint* arXiv:1311.4780, 2013.
Rasmussen, C. E., "Gaussian processes for machine learning," 2006.
Salakhutdinov, R. et al., "Restricted Boltzmann Machines for collaborative filtering," *ICML*. 2007.
Tibbits, M. M. et al., "Parallel multivariate slice sampling," *Statistics and Computing*, vol. 21, 2011.
Titsias, M. K. et al., "Markov chain monte carlo algorithms for gaussian processes," *Inference and Estimation in Probabilistic Time-Series Models*, vol. 9, 2008.
https://archive.ics.uci.edu/ml/datasets/Dow+Jones+Index, "UCI Machine Learning Repository," 2016.
https://archive.ics.uci.edu/ml/datasets/MHEALTH+Dataset, "UCI Machine Learning Repository," 2016.
Welling, M. et al., "Bayesian learning via stochastic gradient langevin dynamics," *ICML*, 2011.
"Xilinx datasheet," https://www.xilinx.com/support/documentation/userguides/ug4737SeriesMemoryResources.pdf.

* cited by examiner

HARDWARE-BASED MACHINE LEARNING ACCELERATION

RELATED APPLICATION

This application is a national phase entry of Patent Cooperation Treaty Application No. PCT/US2018/016136 filed Jan. 31, 2018, entitled "HARDWARE-BASED MACHINE LEARNING ACCELERATION," which claims the benefit of priority to U.S. Provisional Application No. 62/452,880 entitled "AUTOMATED SCALABLE FRAMEWORK FOR DYNAMIC CASUAL BAYESIAN LEARNING ON FPGA," filed on Jan. 31, 2017, the disclosures of which are incorporated herein by reference in their entirety.

TECHNICAL FIELD

The subject matter described herein relates generally to machine learning and more specifically to hardware-based machine learning accelerators.

BACKGROUND

Machine learning models may be trained to perform a variety of interference tasks including, for example, regression, classification, belief propagation, expectation maximization, and/or the like. In particular, probabilistic machine learning models (e.g., Bayesian networks, belief networks, and/or the like) may be capable of predicting the probability of a future observation based on one or more earlier observations. For example, a probabilistic machine learning model may be trained to forecast how much a change in interest rate (e.g., federal funds rate) may affect the value of a stock market index (e.g., Dow Jones Industrial Average).

SUMMARY

Systems, methods, and articles of manufacture, including computer program products, are provided for hardware-based machine learning acceleration. In some example embodiments, there is provided a system that includes at least one processor and at least one memory. The at least one memory may include program code that provides operations when executed by the at least one processor. The operations may include: partitioning, into a first batch of data and a second batch of data, an input data received at a hardware accelerator implementing a machine learning model, the input data comprising a continuous stream of data samples, and the input data being partitioned based at least on a resource constraint of the hardware accelerator; updating a probability density function associated with the machine learning model, the probability density function being updated by at least processing, by the hardware accelerator, the first batch of data before the second batch of data; and generating, based at least on the updated probability density function, an output comprising a probability of encountering a data value.

In some variations, one or more features disclosed herein including the following features can optionally be included in any feasible combination. The probability density function may be updated in real time such that the updating of the probability density function is performed at a same time and/or substantially at the same time as the generation of the output comprising the probability of encountering the data value.

In some variations, each data sample may include a plurality of data values corresponding to a plurality of features. The first batch of data and the second batch of data may each include some but not all of the plurality of features. The first batch of data and the second batch of data may each include some but not all of the data samples included in the input data.

In some variations, the machine learning model may include a probabilistic machine learning model configured to perform an inference task. The probabilistic machine learning model may include a Bayesian network and/or a belief network.

In some variations, the hardware accelerator may process the first batch of data and/or the second batch of data by at least applying, to the first batch of data and/or the second batch of data, one or more Markov Chain Monte Carlo (MCMC) techniques. The first batch of data and/or the second batch of data may each be a matrix. The application of the one or more Markov Chain Monte Carlo techniques may include performing a sequence of dot product operations between two or more matrices comprising the first batch of data and/or the second batch of data. The hardware accelerator may include a tree adder configured to perform the sequence of dot product operations by at least performing, in parallel, at least a portion of a plurality of addition operations and/or multiplication operations comprising the sequence of dot product operations.

In some variations, the probability of encountering the data value may change upon processing the second batch of data. The output may include a first probability of encountering the data value given the first batch of data and a second probability of encountering the data value given the second batch of data.

In some variations, the hardware accelerator comprises one or more application specific integrated circuits (ASICs) and/or field programmable gate arrays (FPGAs).

In some variations, the probability density function may include a predictive function. The predictive function may be associated with a mean and a covariance of a prior distribution of the input data. The prior distribution of the input data may indicate the probability of encountering the data value without taking into account the first batch of data and/or the second batch of data. The update to the probability density function may include updating, based at least on the first batch of data and/or the second batch of data, the mean and/or the covariance of the prior distribution. The update to the probability density function may further include determining, based at least on the prior distribution, a gradient of a posterior distribution of the input data. The posterior distribution of the input data may indicate the probability of encountering the data value given the first batch of data and/or the second batch of data.

In some variations, the determination of the gradient may include computing an inverse of a covariance matrix corresponding to the covariance of the prior distribution. The inverse of the covariance matrix may be computed by at least performing a plurality of QR decompositions. The plurality of QR decompositions may be performed to compute an inverse of an upper triangular matrix R. The hardware accelerator is configured to compute the inverse of the upper triangular matrix R by at least performing back-substitution.

In some variations, the partitioning of the input data may be further based at least on a dimensionality of the input data and/or a rate at which the input data is received at the hardware accelerator.

In some variations, the first batch of data may be further divided into a first portion of data and a second portion of data. The first portion of data and the second portion of data may be stored in different memory blocks to at least enable the first portion of data and the second portion of data to be accessed simultaneously for processing by the hardware accelerator during the update of the probability density function.

In some variations, the resource constraint may correspond to a quantity of block random access memory (BRAM), digital signal processing (DSP) units, and/or memory bandwidth available at the hardware accelerator. The resource constraint may include a runtime constraint, a memory constraint, and/or a power constraint that prevents the hardware accelerator from processing the first batch of data and the second batch of data simultaneously.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers may denote similar structures, features, and/or elements.

DETAILED DESCRIPTION

Figure 1:
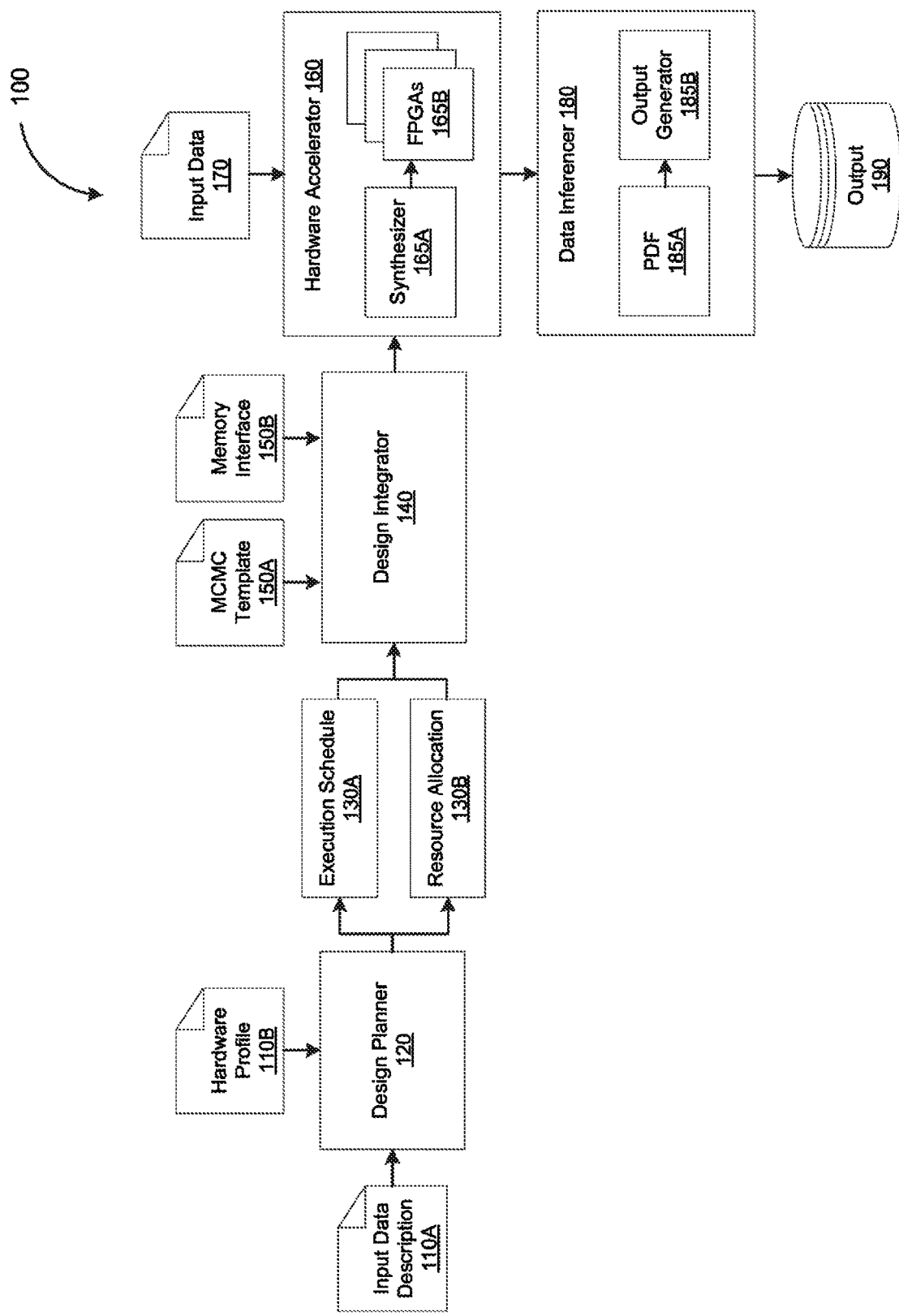
FIG. 1 depicts a block diagram illustrating a machine learning system, in accordance with some example embodiments.

Training a probabilistic machine learning model (e.g., Bayesian network, belief network, and/or the like) to predict the probability of encountering a data value in the future may require generating a probability density function based on input data that includes samples of data values encountered in the past. For example, one or more Markov Chain Monte Carlo (MCMC) techniques may be applied to the input data in order to derive the probability density function, which may capture one or more structural trends in the data values included in the input data. Where the input data is a continuous stream of data samples whose values evolve over time (e.g., time-series data), the probability density function may require constant updates in order to reflect new structural trends that may arise with the input of additional data samples. But updating the probability density function may incur significant resource overhead including, for example, time, bandwidth, energy, and/or the like. In particular, the slow runtime associated with updating the probability density function may prevent real time applications in which the probabilistic machine learning model may be required to provide future forecasts while being simultaneously trained on a continuous stream of new data samples. As such, in some example embodiments, the probabilistic machine learning model may be subject to hardware-based acceleration that reduces the runtime associated with updating the underlying probability density function.

In some example embodiments, a machine learning model (e.g., a probabilistic machine learning model and/or the like) may be implemented using a hardware accelerator including, for example, one or more field programmable gate arrays (FPGAs), application specific integrated circuits (ASICs), and/or the like. As used herein, a hardware accelerator may refer to computer hardware (e.g., FPGAs, ASICs, and/or the like) that has been specifically configured to implement the machine learning model. The hardware accelerator may be used to implement the machine learning model instead of software running on a general-purpose central processing unit (CPU). It should be appreciated that the hardware accelerator may implement the machine learning model with greater efficiency than software running on a general-purpose central processing unit. For example, the hardware accelerator may provide greater concurrency and/or more optimal data paths than the general-purpose central processing unit. In doing so, the hardware accelerator may expedite the operations of the machine learning model. For instance, the hardware accelerator may be reduce the runtime associated with updating the probability density function associated with a probabilistic machine learning model, thereby allowing the probabilistic machine learning model to be deployed for real time applications.

As noted, the machine learning model may be trained based on input data that includes a continuous stream of data samples. For instance, the machine learning model may receive, at a certain frequency, a quantity of data samples. But the hardware accelerator implementing the machine learning model may impose one or more resource constraints (e.g., runtime, power, memory, and/or the like) that prevent the machine learning model from processing all of the input data at once. As such, in some example embodiments, the continuous stream of data samples input into the machine learning machine may be partitioned, based on the one or more resource constraints, into multiple batches of data samples. For example, the hardware accelerator may be unable to update the probability density function associated with a probabilistic machine learning model based on all of the data samples input into the hardware accelerator at once. Instead, the stream of data samples input into the hardware accelerator may be partitioned into multiple batches of data samples and the underlying probability density function of the probabilistic machine learning model may be updated based on some but not all of the batches of data samples at a time.

FIG. 1 depicts a block diagram illustrating a machine learning system 100, in accordance with some example embodiments. Referring to FIG. 1, the machine learning system 100 may include a design planner 120, a design integrator 140, a hardware accelerator 160, and a data inferencer 180. As shown in FIG. 1, the hardware accelerator 160 may include a synthesizer 165A and a plurality of field programmable gate arrays 165B. Meanwhile, the data inference 180 may include a probability density function 185A and an output generator 185B.

In some example embodiments, the hardware accelerator 160 may be configured to implement a machine learning model. For example, the hardware accelerator 160 may implement a probabilistic machine learning model including, for example, a Bayesian network, a belief network, and/or the like. The probabilistic machine learning model may be configured to perform one or more inference tasks including, for example, classification, regression, and/or the like. In doing so, the probabilistic machine learning model may predict, based on an input data 170, a probability of encountering a data value in the future. According to some example embodiments, the input data 170 may be a continuous stream of data samples (e.g., time series data and/or the like). Furthermore, the input data 170 may exhibit causality such that a causal relationship may exist between at least some of the data samples included in the input data 170. For example, encountering a first data value in the input data 170 may change the probability of subsequently encountering a second data value.

In order to predict the probability of encountering a particular data value y* in the future, the hardware accelerator 160 may generate, based at least on the input data 170, a probability density function 185A. The probability density function 185A may capture one or more structural trends within the input data 170. For instance, the input data 170 may include a plurality of data samples which, as noted, may be streamed continuously. The plurality of data samples may pairs of (x,y) values in which $x=\{x_i=[x_{i1}, \ldots, x_{id}]\}_{i=1}^n$ may denote the individual features present in each data sample, $y=[y_1, \ldots, y_n]$ may denote the data values associated with the features, d may denote the size of the feature space and/or the dimensionality of the input data 170, and n may denote the quantity of data samples included in the input data 170. It should be appreciated that the size d of the feature space may correspond to a quantity of features $x_i$ associated with each data sample included in the input data 170. Moreover, the quantity n of data samples included in the input data 170 may increase over time where the input data 170 is a continuous stream data samples.

The probability density function 185A may be map each feature $x_1$ to a corresponding value $y_1$ in accordance with Equation (1) below:

$$y_i = f(x_i) + \varepsilon_i \qquad (1)$$

wherein $\varepsilon_i$ may denote an observation noise that determines how different the values $y_i$ may be from an output of the predictive function $f(x_i)$. The observation noise $\varepsilon_i$ may be modeled as a Normal distribution variable with zero mean and a variance of $\sigma_n^2$. Meanwhile, the predictive function $f(x)$ may be approximated based on Equation (2) below:

$$f(x) = GP(m(x), K(x, x')) \qquad (2)$$

wherein $m(x)$ may denote a mean kernel and $K(x, x')$ may denote a covariance kernel. As Equation (2) indicates, the predictive function $f(x)$ may be approximated by a Gaussian process GP of the mean kernel $m(x)$ and the covariance kernel $K(x)$. Mean and covariance may hyper-parameters, which may be the parameters of a prior distribution forming the basis of the predictive function $f(x)$. For instance, correlation between the values $y_i$ may be captured by the mean kernel $m(x)$ and the covariance kernel $K(x)$. Here, the covariance kernel $K(x)$ may be a squared-exponential kernel expressed by Equation (3) below. It should be appreciated that the covariance kernel $K(x)$ may be selected based on the predictive function $f(x)$.

$$K_{ij}(x) = \sigma_n^2 e^{\left(-\frac{1}{2}(x_i - x_j)^T \sum^{-1}(x_i - x_j)\right)} \qquad (3)$$

wherein $\Sigma$ may denote a diagonal positive matrix $\Sigma = \text{diag}[L_1^2, \ldots, L_d^2]$ in which each diagonal element may be a length-scale parameter for a given dimension of the input data 170. Estimating the length-scale parameters may enable the elimination of irrelevant dimensions that may be uncorrelated with the output 190.

It should be appreciated that the probability of encountering a particular data value y* in the future may be expressed as $p(y|f, \sigma_n^2)$. Meanwhile, the prior distribution associated with the input data 170 may be expressed as $p(f|\gamma)$ and the posterior distribution associated with the input data 170 may be expressed as $p(\theta|D)$. As used herein, the prior distribution $p(f|\gamma)$ may refer to the probability of encountering the data value y* without taking into account current data samples and the posterior distribution $p(\theta|D)$ may refer to the probability of encountering the data value y* given the current data samples.

Determining the probability $p(y|f, \sigma_n^2)$ of encountering the data value y* may require computing the posterior distribution $p(\theta|D)$. Here, $\theta = [\gamma, \sigma_n^2]$ may denote the set of hyper-parameters associated with the probability density function 185A. As used herein, the hyper-parameter of the probability-density function 185A may refer to the parameters of the prior distribution including, for example, the mean, the covariance, and/or the like. Meanwhile, $\gamma$ may denote one or more hyper-parameters of the predictive function $f(x)$ and $\sigma_n^2$ may, as noted, denote the variance associated with the observation noise $\varepsilon_i$. An inference task (e.g., regression, classification, and/or the like) may be expressed by Equation (4) below:

$$E_{p(\theta|D)}[g(\theta)] = \int g(\theta)p(\theta|D)d\theta \qquad (4)$$

wherein $g(\theta)$ may denote any function of interest that require evaluation, for example, by the machine learning system 100. Here, substituting the function $g(\theta)$ with $p(y^*|\theta)$ may enable a prediction of the probability of encountering the data value $y^*$ based on previously observed data values in accordance with $p(y^*|D) = \int p(y^*|\theta)p(\theta|D)d\theta$.

As noted, to predict the probability of encountering the data value $y^*$ may require generating the probability density function 185A, which may in turn require determining the set of hyper-parameters $\theta = [\gamma, \sigma_n^2]$. Where the input data 170 is a continuous stream of data samples that evolves over time with the addition of new data samples, the hardware accelerator 160 may continue to update the probability density function 185A including by at least updating the set of hyper-parameters $\theta = [\gamma, \sigma_n^2]$. The probability density function 185A may be updated to reflect changes in the structural trends present in the input data 170 as new data samples are added to the input data 170.

In some example embodiments, the hardware accelerator 160 may generate and/or update the probability density function 185A by at least applying, to the input data 170, one or more Markov Chain Monte Carlo techniques. The hardware accelerator 160 may apply the one or more Markov Chain Monte Carlo techniques in order to approximate Equation (3). Otherwise, the large cardinality of the set of hyper-parameters $\theta = [\gamma, \sigma_n^2]$ may render Equation (3) computationally impractical to evaluate and may thus prevent the performance of the corresponding interference task (e.g., classification, regression, and/or the like). The one or more Markov Chain Monte Carlo techniques may operate iteratively by at least constructing a Markov chain in which each state of the Markov chain corresponds to a new random sample from the posterior distribution $p(\theta|D)$. The approximation of Equation (4) using random samples from the posterior distribution $p(\theta|D)$ may be expressed by Equation (5) below.

$$\tilde{E}_{p(\theta|D)}[g(\theta)] = \frac{1}{N}\sum_{i=1}^{N} g(\theta^{(i)}) \qquad (5)$$

Referring again to FIG. 1, the one or more Markov Chain Monte Carlo techniques may be specified by a Markov Chain Monte Carlo template 150A. Furthermore, it should be appreciated that the hardware accelerator 160 may generate the probability density function 185A by applying any appropriate Markov Chain Monte Carlo techniques including, for example, population-based Markov Chain Monte Carlo, state space model Markov Chain Monte Carlo, Gibbs sampling, slice sampling, Hamiltonian Markov Chain Monte Carlo, adaptive Markov Chain Monte Carlo, and/or the like. Table 1 below provides a description of at least some of the Markov Chain Monte Carlo techniques that may be applied to the input data 170 when generating the probability density function 185A.

TABLE 1

Markov Chain Monte Carlo Techniques

| MCMC Methods | Description |
| --- | --- |
| Population-based | Population-based MCMC is a method designed to address the issue of multi-modality using a population of Markov chains. This method is particularly inefficient for analyzing high-dimensional data, due to the high cost of unnecessary space exploration. |
| State Space Model | State Space Model (SSM) MCMC targets Bayesian applications in which evaluating the closed-form PDF is not feasible. SSMs assumes the availability of unbiased estimators to complete the acceptance ratio in each MCMC step. This assumption does not often hold in practice. |
| Gibbs Sampling | Gibbs sampling decomposes the proposal distribution into its individual components by computing the full conditional distribution of the variable $\theta_i$ conditional on all the remaining ones. Gibbs sampling encounters serious computational inefficiency in solving high-dimensional tasks with highly correlated variables. |
| Slice Sampling | Slice sampling method uniformly samples from the area under the $p(\theta)$ graph as an equivalent to sampling from the probability distribution. This technique improves mixing performance in learning tasks with highly correlated variables. The complexity of Slice sampling scales exponentially with the data dimensionality. |
| Hamiltonian | Hamiltonian MCMC method uses the gradient of the target probability distribution to select better movements in each iteration. This method is particularly of interest as it can handle both strong correlations and high-dimensionality of the probability distribution. |
| Adaptive | Adaptive MCMC method adjusts the proposal distribution in the execution time to achieve a better sampling efficiency. The adaptive kernel might converge to a non-stationary distribution if not designed carefully. |

In some example embodiments, by generating and/or updating the probability density function 185A based on the input data 170, the machine learning system 100 may be solving the following objective function (6):

Observation Model: $y|f,\sigma_n^2 \sim \Pi_{i=1}^N p(y_i|f_i,\sigma_n^2)$,

GP Prior: $f(x)|\gamma \sim GP(m(x), K(x,x'|\gamma))$,

Hyper-Parameters Prior: $\theta = [\gamma, \sigma_n^2] \sim p(\gamma)p(\sigma_n^2)$ \qquad (6)

wherein $\sigma_n^2$ may denote the variance of the observation noise $\varepsilon_i$ per Equation (1) above, and $\gamma$ may denote one or more hyper-parameters of the predictive function $f(x)$ defined as GP. As noted, the hardware accelerator 160 may iteratively update the set of hyper-parameters denoted $\theta = [\gamma, \sigma_n^2]$ when new data samples are added to the input data 170.

As noted, the hardware accelerator 160 may include the plurality of field programmable gate arrays 165B. The hardware accelerator 160 may be associated with one or more resource constraints due to the plurality of field programmable gate arrays 165B being associated with limited resources including, for example, block random access memory (BRAM), digital signal processing (DSP) units, memory bandwidth, and/or the like. These resource constraints may prevent the hardware accelerator 160 from processing all of the input data 170 received at the hardware accelerator 160 at once. Thus, in some example embodiments, the design planner 120 may be configured to determine a partitioning of the input data 170 that best fits the resource constraints of the hardware accelerator 160. For example, the design planner 120 may determine to partition the input data 170 into one or more batches of data samples such that the hardware accelerator 160 may be unable to process at least a single batch of the data samples at a time.

To further illustrate, as shown in FIG. 1, the design planner 120 may receive an input data description 110A. The input data description 110A may include a description of the input data 170 that requires processing by the hardware accelerator 160. For example, the input data description 110A may include a rate at which the data samples (e.g., (x,y) pairs) that form the input data 170 may arrive at the hardware accelerator 160. Alternatively and/or additionally, the input data description 110A may indicate a size of each data sample including, for example, the size d of the features space associated with the input data 170 which, as noted, may correspond to the quantity of features $x_1$ associated with each data sample included in the input data 170.

Referring again to FIG. 1, the design planner 120 may also receive a hardware profile 110B, which may include a description of the one or more resource constraints associated with the hardware accelerator 160. As, the plurality of field programmable gate arrays 165B may be associated with limited resources, including, for example, block random access memory (BRAM), digital signal processing (DSP) units, memory bandwidth, and/or the like. These resource limitations may give rise to one or more resource constraints including, for example, a runtime constraint $T_u$, a memory constraint $M_u$, a power constraint $P_u$, and/or the like.

As noted, the resource constraints at the hardware accelerator 160 may prevent the hardware accelerator 160 from processing all of the input data 170 all at once. For example, the hardware accelerator 160 may be unable to update the probability density function 185A by applying, in accordance with the Markov Chain Monte Carlo Template 150A, one or more Markov Chain Monte Carlo techniques to all of the input data 170 at once. Instead, in some example embodiments, the design planner 120 may partition the input data 170 into one or more batches of data samples that can be processed by the hardware accelerator 160. As used herein, a batch of data samples from the input data 170 may include some but not all of the data samples included in the input data 170.

In some example embodiments, the design planner 120 may determine a partitioning of the input data 170, for example, into one or more batches of data samples. As used herein, a batch of data samples may refer to a portion of the input data 170 that includes some but not all of the data samples included in the input data 170. For example, the design planner 120 may determine to partition the input data 170 into batches of data samples having a batch size $b_s$. The input data 170 may be partitioned horizontally and/or vertically. For instance, a horizontal partition may include some but not all of the d quantity of features included in each data sample. Alternatively and/or additionally, a vertical partition may include some but not all of the n quantity of data samples included in the input data 170.

It should be appreciated that the design planner 120 may determine a value of the batch size $b_s$ that is optimal given the resource constraints of the hardware accelerator 160. The optimal value for the batch size $b_s$ may be one which provides maximum throughput and/or maximum utilization of the resources associated with the plurality of field programmable gate arrays 165B including, for example, block random access memory (BRAM), digital signal processing (DSP) units, memory bandwidth, and/or the like. In some example embodiments, the design planner 160 may determine the batch size $b_s$ by at least testing different values of the batch size $b_s$ and identifying a value of the batch size $b_s$ that provides the best performance at the hardware accelerator 160. Alternatively and/or additionally, the design planner 160 may determine the batch size $b_s$ by at least solving the following objective function (7).

minimize $b_s, n_k$ (MC mixing time), subject to: $T^{comm} + T^{comp} \leq T_u$, $\eta n_k b_s \leq f_{data} T_u$, $M_{comp} \leq M_u$, $P_{comp} < P_u$, $n_k \in \mathbb{N}$       (7)

wherein $T_u$ may denote the runtime constraint of the hardware accelerator 160, $M_u$ may denote the memory constraint of the hardware accelerator 160, $P_u$ may denote the power constraint of the hardware accelerator 160, $T_{comp}$ may denote the runtime associated with the batch size $b_s$, $M_{comp}$ may denote the memory footprint associated with the batch size $b_s$, $P_{comp}$ may denote the power requirement associated with the batch size $b_s$, $f_{data}$ may denote the rate at which new data samples are added to the input data 170, $n_k$ may denote the quantity of data samples included in the input data 170, and $\eta$ may denote the proportion of new data samples in a batch of data samples having the batch size $b_s$.

In some example embodiments, as shown in FIG. 1, the design planner 120 may generate, based at least on the input data description 110A and/or the hardware profile 110B, an execution schedule 130A and/or a resource allocation 130B. The execution schedule 130A may be a schedule for processing the one or more batches of data samples at the hardware accelerator 160 while the resource allocation 130B may specify an allocation of the resources (e.g., block random access memory (BRAM), digital signal processing (DSP) units, memory bandwidth, and/or the like) for processing the one or more batches of data samples. For instance, the execution schedule 130A may specify a portion of the input data 170 that may be processed by the hardware accelerator 160 at any one time. As noted, the hardware accelerator 160 may be able to process a vertical and/or a horizontal partition of the input data 170 having the batch size the batch size $b_s$, which may be determined based on one or more resource constraints associated with the hardware accelerator 160 including, for example, a runtime constraint $T_u$, a memory constraint $M_u$, a power constraint $P_u$, and/or the like.

In some example embodiments, the design integrator 140 may customize the Markov Chain Monte Carlo template 150A based on execution schedule 130A and/or the resource allocation 130B determined by the design planner 120. As noted, the Markov Chain Monte Carlo template 150A may specify the Markov Chain Monte Carlo techniques used by the hardware accelerator 160 in order to generate and/or update the probability density function 185A. The design integrator 14 may, for example, converts the execution schedule 130A into state machines and/or microcodes that may be embedded, by the synthesizer 165A, within the plurality of field programmable gate arrays 165B.

It should be appreciated that the synthesizer 165A may configure the plurality of field programmable gate arrays 165B in a manner that enables the hardware accelerator 160 to implement a probabilistic machine learning model including, for example, a Bayesian network, a belief network, and/or the like. Furthermore, the plurality of field programmable gate arrays 165B may be configured to process individual batches of data samples from the input data 170. For example, the plurality of field programmable gate arrays 165B may process a batch of data samples by at least applying, to that batch of data samples, one or more Markov Chain Monte Carlo techniques. Application of the one or more Markov Chain Monte Carlo techniques to the batch of data samples may update the probability density function 185A (e.g., the set of hyper-parameters θ) based at least on the addition of the batch of data samples.

The probability density function 185A may be used to perform one or more interference tasks including, for example, regression, classification, and/or the like. For example, the output generator 185B at the data inferencer 180 may determine, based at least on the probability density function 185A, an output 190 that includes the probability of encountering a particular data value in the future. As noted, the hardware accelerator 160 may be configured to continuously update the probability density function 185A based on the input data 170, which may evolve over time as new data samples are constantly added to the input data 170. In doing so, the machine learning system 100 may be capable of supporting real time application that require the output 190 to be generated at a same time and/or substantially at the same time as when the probability density function 185A is being updated to account for the addition of the new data samples. That is, the generation of the output 190 and the updating of the probability density function 185A may occur in parallel and/or substantially in parallel.

For example, the machine learning system 100 may be configured to predict the future value of a stock market index (e.g., Dow Jones Industrial Average). Here, the input data 170 may include daily stock data for the companies that make up the stock market index. Each data sample (x,y) may be associated with a plurality of features $x_i$ including, for example, stock price at the beginning and at the end of a week, the highest price and the lowest price during a week, trade volume for a current week and a previous week, a percentage of change in stock price throughout a week, a percentage of change in trade volume between a current week and a previous week, and/or the like. Furthermore, each data sample (x,y) may also be associated with a plurality of data values $y_i$ corresponding to each feature $x_i$. According to some example embodiments, the machine learning system 100 may be able to predict the future value of the stock market index in real time. That is, the machine learning system 100 may generate the output 190, which may include forecasts for the future value of the stock market index, while processing, at a same time and/or substantially at the same time, the latest stock data that is being continuously input into the machine learning system 100.

Table 2 below depicts pseudo programming code for implementing, at the machine learning system 100, a probabilistic machine learning model including, for example, a Bayesian network, a belief network, and/or the like.

TABLE 2

Algorithm 1 CausaLearn Pseudocode

Inputs: Stream of input data (D = [X, Y]), Initial parameters $\theta^{(1)}$, Desired Markov Chain length ($C_{len}$), discretization factor dt, number of discretization steps $n_{step}$, Updating frequency $n_u$, Mass matrix (M), Constant friction term (F), Portion of newly arrived data in each data batch η, Physical constraints $C_u = [T_u, M_u, P_u]$.
Outputs: Posterior Distribution Samples $\theta^{(i)}$, and output decision set $\mathcal{O}$.

Figure 2:
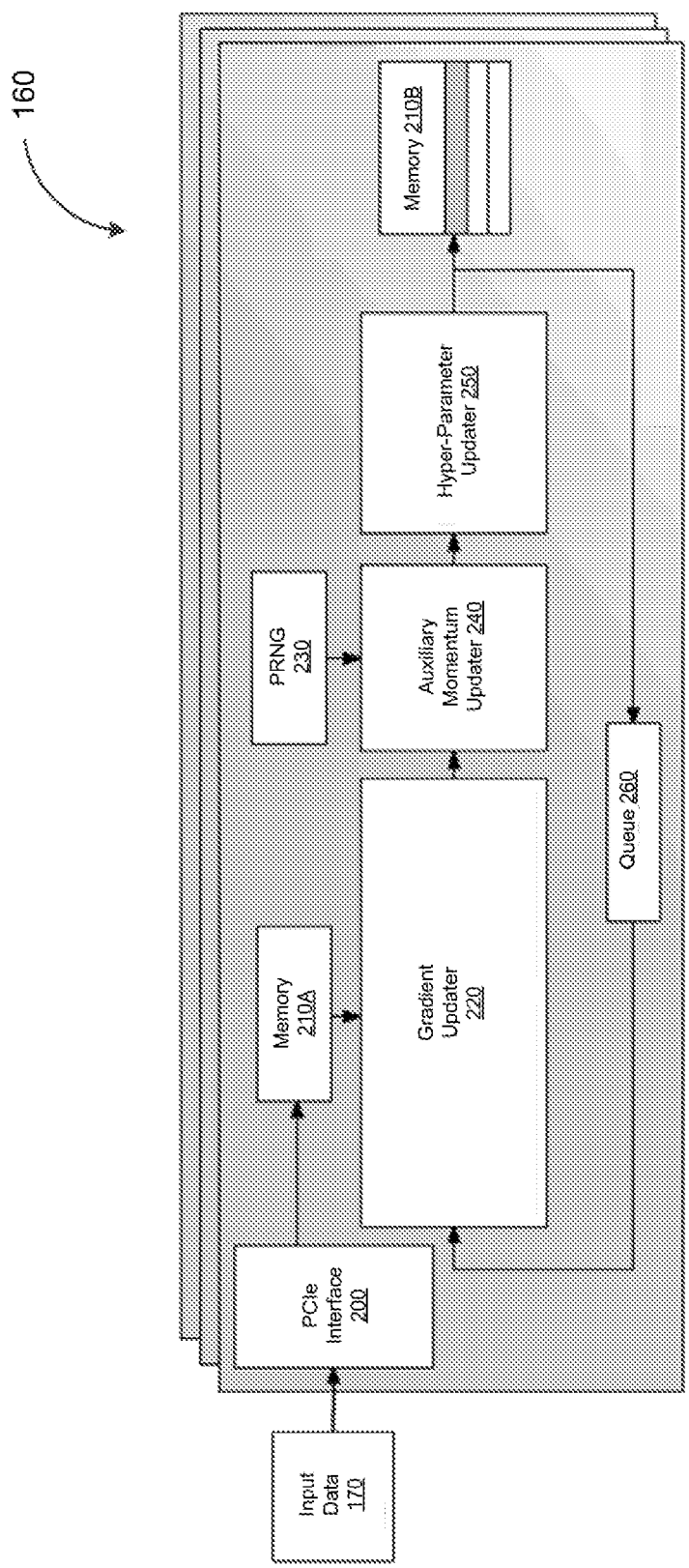
FIG. 2 depicts a block diagram illustrating a hardware accelerator, in accordance with some example embodiments.

1: $HW_{spec} \leftarrow$ PlatformProfiling( )
2: $[b_s, HW_{code}] \leftarrow$ Customization($HW_{spec}, C_u$)
3:     Programming FPGA($HW_{code}$)
4:     for i = 1, 2, . . . , $C_{len}$ do
5:       if (i mod $n_u$) = = 0 then
6:         [X̃, Ỹ] ← DataPartitioning(X, Y, $b_s$, η)
7:         Transferring Data Batch D̃ to FPGA
8: $r^{(i)} \sim \mathcal{N}(0, M)$
9: $(\theta_1, r_2) \leftarrow (\theta^{(i)}, r^{(i)})$
10: $B = \frac{1}{2}\sigma_n^2 dt$
11,12: $E = \sqrt{2|F - B|dt}$
      for t = 2, . . . , $n_{step}$ do
13:     $\theta_t \leftarrow \theta_{t-1} + M^{-1} r_{t-1} dt$
14:     $\nabla \tilde{U}(\theta_t) \leftarrow$ gradient($\tilde{D}, \theta_t$)
15:     $r_t \leftarrow r_{t-1} - \nabla \tilde{U}(\theta_t) dt - FM^{-1} r_{t-1} dt + \mathcal{N}(0, E)$
      end for
16:     $(\theta^{(i+1)}, r^{(i+1)}) \leftarrow (\theta_{n_{step}}, r_{n_{step}})$
17:     Sending Back $\theta^{(i+1)}$ to the Host
18: $\tilde{\theta} =$ HyperParameterPrunning($\theta$)
19: $\mathcal{O} =$ UserDefinedDataInterface($\tilde{\theta}$)
    end for FIG. 2 depicts a block diagram illustrating the hardware accelerator 160, in accordance with some example embodiments. Referring to FIG. 2, the hardware accelerator 160 may include a peripheral component interconnect express (PCIe) interface 200, a gradient updater 220, a pseudorandom number generator (PRNG) 230, an auxiliary momentum updater 240, a hyper-parameter updater 250, and a queue 260.

As shown in FIG. 2, the hardware accelerator 160 may receive the input data 170, which may be a continuous stream of data samples that evolve over time. In some example embodiments, the hardware accelerator 160 may be configured to process one or more batches of data samples. As noted, each batch of data samples may include some but not all of the data samples included in the input data 170 because the resource constraints of the hardware accelerator 160 may prevent the hardware accelerator 160 from processing all of the input data 170 at once. Instead, the hardware accelerator 160 may process one or more batches of data samples at a time. Each batch of data samples may have a batch size $b_s$, which may optimize the performance of the hardware accelerator 160 by at least maximizing throughput and/or resource utilization.

Referring again to FIG. 2, the hardware accelerator 160 may update the probability density function 185A iteratively. For example, at each cycle, the hardware accelerator 160 may process a batch of data samples that includes new data samples added to the input data 170 and a random subset from previous data samples in the input data 170. The random subset of previous data samples from the input data 170 may be held in a first memory 210A. Meanwhile, the new data samples may be loaded, via the peripheral component interconnect express interface 200, into the hardware accelerator 160. According to some example embodiments, the hardware accelerator 160 may process the batch of data samples by at least applying one or more Markov Chain Monte Carlo techniques. In doing so, the hardware accelerator 160 may update the probability density function 185A by at least updating the set of hyper-parameters θ associated with the probability density function 185A.

To further illustrate, let η denote the portion of new data samples in a batch of data samples. Here, η may be a value between zero and one (e.g., 0<η≤1). In some example embodiments, for each cycle, the gradient updater 220 may compute the gradient vector $\nabla \tilde{U}(\theta)$ of the posterior distribution p(θ|D) given the prior distribution p(ƒ|γ) of each hyper-parameter in the set of hyper-parameters θ. It should be appreciated that given a set of independent observations y∈D, the posterior distribution of each hyper-parameter in the set of hyper-parameters θ may be expressed as p(θ|D)∝$e^{(-U(\theta))}$, wherein the energy function U may be expressed as Equation (7) below.

$$U = -\Sigma_{y \in D} \ln p(y|x,\theta) - \ln p(\theta) \qquad (7)$$

The auxiliary momentum updater 240 may update the auxiliary momentum variable r. The computation of the auxiliary momentum variable r may include a friction term configured to minimize the impact of the noise added as a result of bypassing the correction step (e.g., Metropolis-Hastings) required for conventional applications of Markov Chain Monte Carlo techniques. Furthermore, the computation of the auxiliary momentum variable r may include sampling from N(0,E) based on the output of the pseudo-random number generator 230.

In some example embodiments, the hyper-parameter updater 250 may update the set of hyper-parameters θ based on the gradient vector $\nabla \tilde{U}(\theta)$ computed by the gradient updater 220 and the auxiliary momentum variable r computed by the auxiliary momentum updater 240. The set of hyper-parameters θ may be stored at a second memory 210B. As noted, the set of hyper-parameters θ may be updated iteratively. Thus, as shown in FIG. 2, previous values for the set of hyper-parameters θ may be held in a queue 260 and fed back into the gradient updater 220, for example, on a first-in-first-out (FIFO) basis.

In some example embodiments, the primary computational workload at the hardware accelerator 160 may be associated with computing the gradient vector $\nabla \tilde{U}(\theta)$ of the posterior distributions p(θ|D) based on the prior distribution p(ƒ|γ) of each hyper-parameter in the set of hyper-parameters θ. Table 3 below depicts pseudo-programming code for computing the gradient vector $\nabla \tilde{U}(\theta)$ at the gradient updater 220.

TABLE 3

Algorithm 2 GP Gradient Computing

Inputs: Batch of input data ($\tilde{D} = [\tilde{X}, \tilde{Y}]$,
Hyperparameters set (θ = [$\sigma_n^2$, $\sigma_k^2$, $\mathcal{L}_1$, . . . $\mathcal{L}_d$]
Outputs: Gradient of energy function $\nabla \tilde{U}(\theta)$.
1: $Q^{(0)} \leftarrow [\ ]$
2: $R^{(0)} \leftarrow [\ ]$
3: $H^{(0)} \leftarrow [0, 0, \ldots, 0]_{1 \times b_s}^T$ TABLE 3-continued Algorithm 2 GP Gradient Computing 4: for i = 1, 2 . . . , $b_s$ do
5:  for j = 1, 2 . . . , $b_s$ do
6:
$$v^2 \leftarrow \sum_{k=1}^{d} \frac{(\tilde{X}_{ik} - \tilde{X}_{jk})^2}{\mathcal{L}_k^2}$$

7:
$$H_j \leftarrow \sigma_k^2 \exp\left(\frac{-v^2}{2}\right)$$

end for
8: $H_i \leftarrow H_i + \sigma_n^2$
9: $[Q^{(i)}, R^{(i)}] \leftarrow$ QR_Update($Q^{(i-1)}$, $R^{(i-1)}$, H)
 end for
10:
$$Z_i \leftarrow R^{-1} Q^T \frac{\partial K}{\partial \theta_i}$$

11:
$$\frac{\partial \ln(p(Y|X,\theta))}{\partial \theta_i} \leftarrow -\frac{1}{2}(Tr(Z_i) + Y^T Z_i R^{-1} Q^T Y)$$

12:
$$\nabla \tilde{U}(\theta_i) \leftarrow \frac{|D|}{|\tilde{D}|}\left(\frac{\partial \ln(p(Y|X,\theta))}{\partial \theta_i} - \nabla \ln(p(\theta_i))\right)$$

As shown in Table 3, the computation of the gradient vector $\nabla \tilde{U}(\theta)$ may require evaluating the term $$\frac{\partial \ln(p(y|x,\theta))}{\partial \theta_i}$$

in the following Equation (8):

$$\frac{\partial \ln(p(y|x,\theta))}{\partial \theta_i} \leftarrow -\frac{1}{2}(Tr(Z_i) + Y^T Z_i R^{-1} Q^T Y) \qquad (8)$$

Evaluating the term $$\frac{\partial \ln(p(y|x,\theta))}{\partial \theta_i}$$

may require computing the inverse of the covariance kernel $$(K_{b_s \times b_s}).$$

The covariance kernel $$(K_{b_s \times b_s})$$

may be a dense matrix with $b_s$>>2. As such, evaluating the term $$\frac{\partial \ln(p(y|x,\theta))}{\partial \theta_i}$$

may entail numerous operations and complex data flows. Thus, in some example embodiments, the application of one or more Markov Chain Monte Carlo techniques may be adapted to include QR decompositions to reduce the complexity of the hardware required to compute the inverse of the covariance kernel K. For example, the hardware accelerator 160 may compute the inverse of the covariance kernel $$(K_{b_s \times b_s})$$

by performing incremental QR decompositions, which may return an orthogonal matrix Q and an upper-triangular matrix R. In doing so, the inversion of the dense covariance kernel matrix $$(K_{b_s \times b_s})$$

may be transformed into the inversion of an upper-triangular matrix ($K^{-1} = R^{-1}Q^T$). The inversion of the upper-triangular matrix ($K^{-1} = R^{-1}Q^T$) may be computed using back substitution, which may be a less complex operation than those required to compute the inversion of the dense covariance kernel matrix $$(K_{b_s \times b_s}).$$

To further illustrate, Table 4 below depicts pseudo-programming code for performing incremental QR decompositions.

TABLE 4

Algorithm 3 Incremental QR decomposition

Inputs: New column H, Last iteration $Q^{s-1}$ and $R^{s-1}$.
Outputs: $Q^s$ and $R^s$.

1: $R^s \leftarrow \begin{pmatrix} R^{s-1} & 0 \\ 0 & 0 \end{pmatrix}$

2: for j = 1, ..., s − 1 do
3:     $R_{j,s}^s \leftarrow (Q_j^{s-1})^T H$
4:     $H \leftarrow H - R_{j,s}^s Q_j^{s-1}$
    end for
5: $R_{s,s}^s \leftarrow \|H\|_2$ 6: $Q^s \leftarrow \left[ Q^{s-1}, \dfrac{H}{R_{s,s}^s} \right]$ In some example embodiments, the machine learning system 100 may implement one or more optimizations in order to expedite the generation and/or the update of the probability density function 185A at the hardware accelerator 160. The one or more optimizations may include optimizing, for example, memory management, matrix computations, data parallelism, and/or the like. As noted, reducing the runtime associated with generating and/or updating the probability density function 185A may enable the machine learning system 100 to support real time applications in which the machine learning system 100 may, at a same time and/or substantially at the same time, provide the output 190 forecasting the probability of encountering the data value y* and be trained based on a continuous stream of input data 170.

Figure 3:
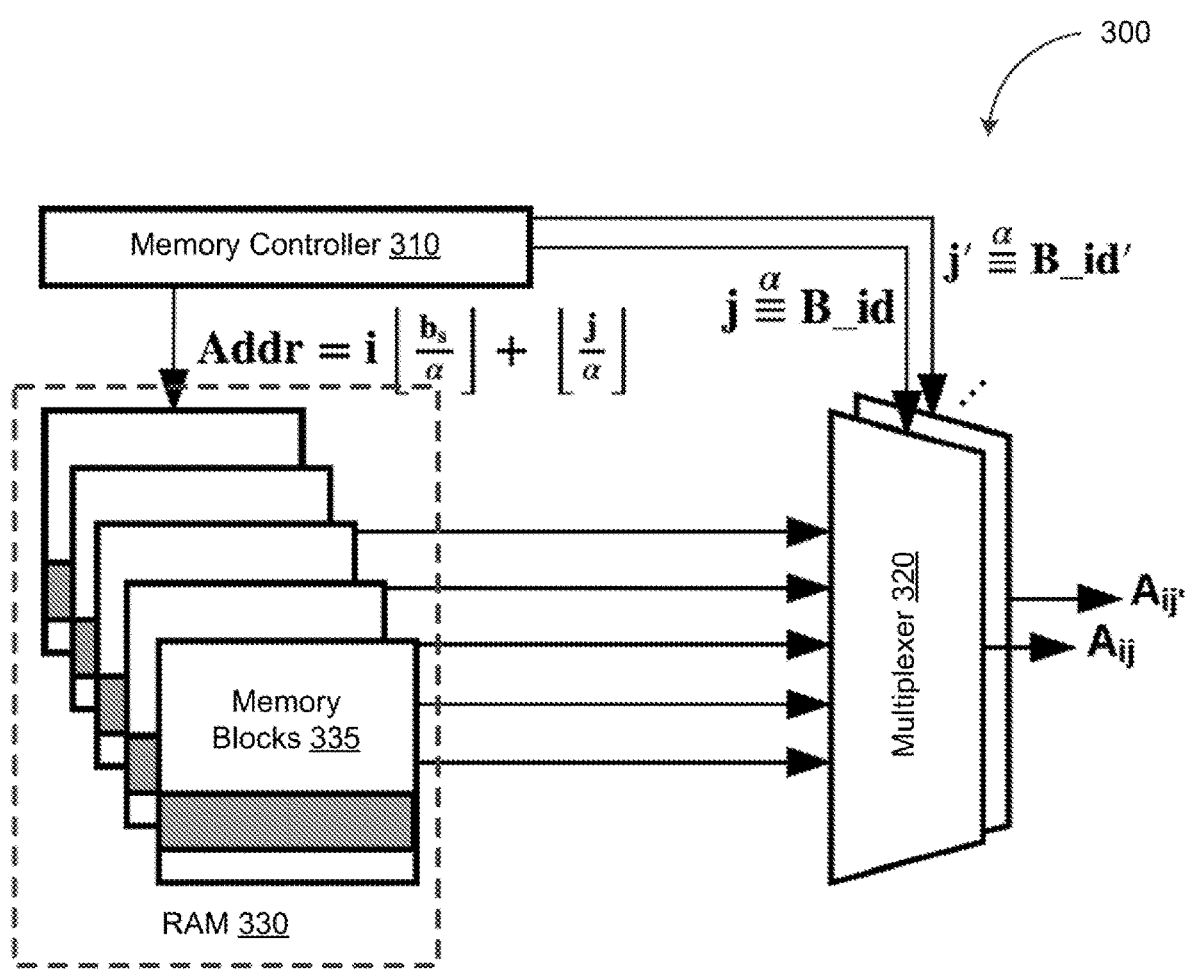
FIG. 3 depicts a block diagram illustrating a memory management system, in accordance with some example embodiments.

FIG. 3 depicts a block diagram illustrating a memory management system 300, in accordance with some example embodiments. Referring to FIG. 3, the memory management system 300 may include a memory controller 310 and a multiplexer 320. The memory controller 310 may be coupled a random access memory (RAM) 330. In some example embodiments, the memory management system 300 may be coupled with the machine learning system 100, for example, via the memory interface 150B. The memory interface 150B may be configured to enable the transfer of data between a central processing unit (CPU) of a host machine and the hardware accelerator 160. Furthermore, the memory management system 300 may be configured to optimize the performance of one or more matrix operations at the machine learning system 100, for example, by the hardware accelerator 160. For example, as noted, the hardware accelerator 160 may process one or more batches of data samples in order to generate and/or update the probability density function 185A. Each batch of data samples may form a single matrix where the data values [$y_1, \ldots, y_n$] associated with each data sample populates the rows (or the columns) of the matrix.

Referring to FIG. 3, the memory controller 310 may be configured to manage access to the random access memory 330 including, for example, the storage of data to and/or the retrieval of data from the random access memory 330. The random access memory 300 may include a plurality of memory blocks 335, which may store the matrices accessed by the hardware accelerator 160 in order to perform the one or more matrix operations. In some example embodiments, to support concurrent access to the same matrix, a single matrix may be partitioned and stored across multiple memory blocks within the random access memory 330. For example, to increase concurrency, the matrix may be stored across a larger quantity of smaller-sized memory blocks than a smaller quantity of larger-sized memory blocks. As shown in FIG. 3, the memory controller 310 may generate the same address signal (addr) for memory blocks storing data from the same matrix. Meanwhile, a block identification index (B id) may be used in conjunction with the address signal (addr) in order to locate a memory block (e.g., from the plurality of memory blocks 335) that holds a certain element from the matrix.

It should be appreciated that the hardware accelerator 160 may perform a matrix operation may require accessing sequential elements from a single matrix. As such, in some example embodiments, the memory controller 300 may load a matrix into a plurality of memory blocks via cyclic interleaving. That is, one element from the matrix may be loaded into one memory block while a next element from the matrix may be loaded into a different memory block. In doing so, sequential elements from the matrix may be accessed simultaneously to perform the matrix operation. For example, as shown in FIG. 3, multiple elements of the matrix may be retrieved from different memory blocks at the same time. The multiplexer 320 may aggregate the elements retrieved from the memory blocks (e.g., into a sequence of elements) and provide the aggregated elements to, for example, the hardware accelerator 160 for performing the required matrix operation.

As noted, a single matrix may be partitioned and stored across multiple memory blocks within the random access memory 330. That matrix may correspond to a single batch of data samples having, for example, the batch size $b_s$. The extent to which the matrix may be partitioned may correspond to an unrolling factor α. A larger unrolling factor α may correspond to a larger quantity of partitions and therefore a larger quantity of smaller sized memory blocks required to store the matrix. Alternatively and/or additionally, a smaller unrolling factor α may correspond to a smaller quantity of partitions and a smaller quantity of larger sized memory blocks required to store the matrix.

It should be appreciated that data stored in different memory blocks may be accessed simultaneously. As such, for a given value of the batch size $b_s$, the unrolling factor α determine the extent of data parallelism including, for example, the operations (e.g., matrix operations) that may be performed at the same time on the same batch of data. Accordingly, a larger unrolling factor α may increase data parallelism and the ability to update the probability density function 185A with a more data retrieved from a larger quantity of smaller sized memory blocks. However, the unrolling factor α may also determine the hardware resources required to perform a matrix operation on the batches of data samples having the batch size $b_s$. Here, a larger unrolling factor α may increase the hardware resources required to perform a matrix operation including, for example, a larger quantity of floating point adders and/or multipliers as well as lookup tables (LUTs). Thus, in some example embodiments, the unrolling factor α may be determined to accommodate the resource constraints of the hardware accelerator 160 including, for example, runtime constraint $T_u$, memory constraint $M_u$, power constraint $P_u$, and/or the like.

Figure 4A:
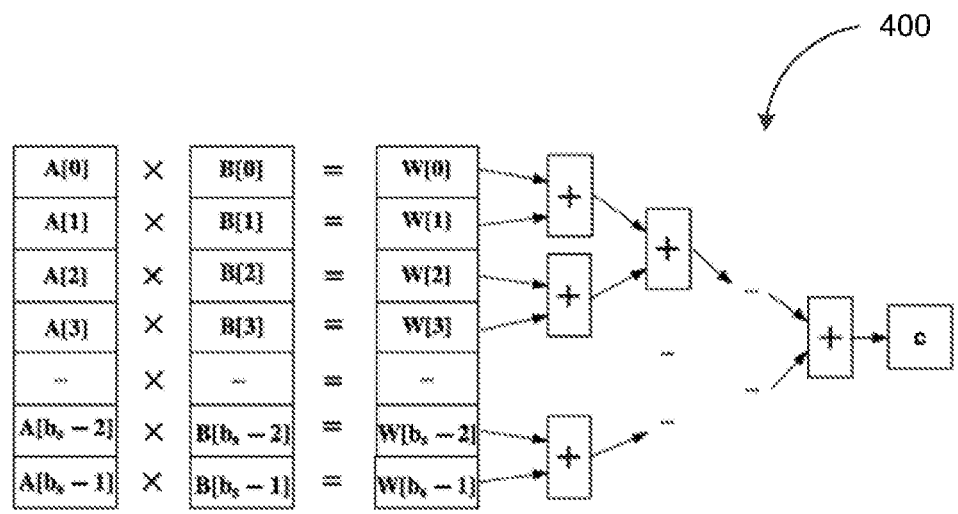
FIG. 4A depicts a block diagram illustrating a tree adder, in accordance with some example embodiments.

In some example embodiments, matrix operations at the hardware accelerator 160 may be further optimized by at least including a tree adder configured to perform sequential matrix operations (e.g., dot product operations) in parallel. To further illustrate, FIG. 4A depicts a block diagram illustrating a tree adder 400, in accordance with some example embodiments. Meanwhile, FIG. 4B depicts a schematic diagram illustrating the tree adder 400, in accordance with some example embodiments.

As noted, the hardware accelerator 160 may generate and/or update the probability density function 165A by at least applying, to the input data 170, one or more Markov Chain Monte Carlo techniques. Applying the Markov Chain Monte Carlo techniques to the input data 170 may require performing matrix-vector multiplications and/or matrix-matrix multiplications. These matrix-vector multiplications and/or matrix-matrix multiplications may further necessitate one or more dot product operations c+=A[i]×B[i], which may be sequential in nature. As such, in some example embodiments, the hardware accelerator 160 may include the tree adder 400 for performing the dot product operations c+=A[i]×B[i]. The tree adder 400 may be used to perform dot product operations c+=A[i]×B[i] instead of the sequential adder 450 shown in FIG. 4C.

Figure 4B:
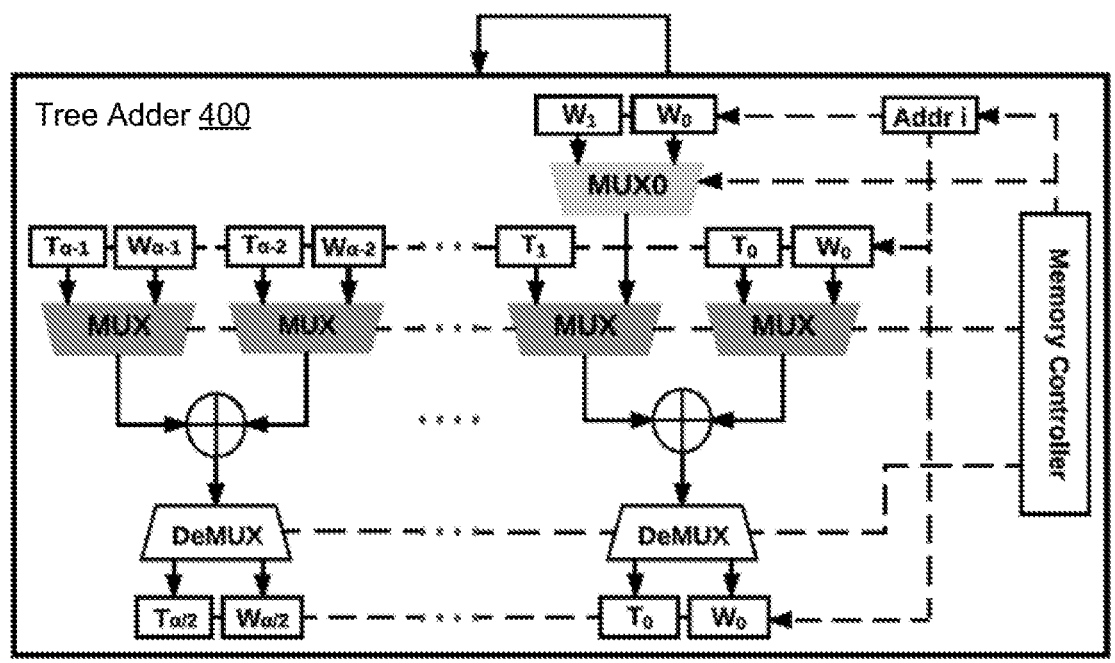
FIG. 4B depicts a schematic diagram illustrating a tree adder, in accordance with some example embodiments.
Figure 4C:
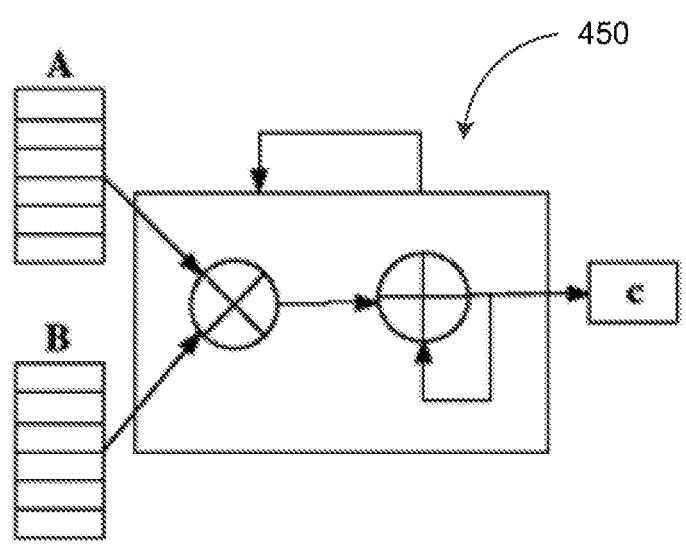
FIG. 4C depicts a block diagram illustrating a sequential adder, in accordance with some example embodiments.

Referring to FIGS. 4A-B, the tree adder 400 may transform the sequential dot product operations c+=A[i]×B[i] into a series of operations W[i]=A[i]×B[i] that can be performed independently and in parallel. For example, as shown in FIG. 4A, the tree adder 400 derive the i-th element from the array W by at least multiplying the i-th element from the array A with the corresponding i-th element from the array B. These multiplication operations may be performed in parallel. Furthermore, the tree adder 400 may compute the final sum c by adding up the values stored in array W. For instance, to derive the final sum c, the tree adder 400 may sum up successive pairs of values from the array W. The tree adder 400 may continue to sum up successive pairs of values in the intermediate results until only a single pair of values remain. The final sum c may be derived by summing together the last remaining pair of values.

Referring again to FIG. 4B, the tree adder 400 may be coupled with the memory controller 310. The tree adder 410 may further include a temporary array T for storing at least some of the intermediate results of summing up the values in the array W. In some example embodiments, at each stage of summing up the array W, the memory controller 310 may store the intermediate results in either the array W or the temporary array T. For example, at some stages of summing up the array W (e.g., the even numbered stages), successive pairs of values from the array W may be summed up and stored to the temporary array T. Alternatively and/or additionally, at other stages of summing up the array W (e.g., the odd numbered stages), successive pairs of values from the temporary array T may be summed up and stored back to the array W. Here, the memory controller 310 may generate the appropriate source addresses and/or destination address within the random access memory 300 such that values may be loaded from and/or stored to the appropriate array.

As noted, computing the gradient vector $\Delta\tilde{U}(\theta)$ of the posterior distributions p(θ|D) based on the prior distribution p(f|γ) of each hyper-parameter in the set of hyper-parameters θ may require significant computational resources due to the complexity associated with computing the inverse of the covariance kernel K. Thus, the hardware accelerator 160 may compute the inverse of the covariance kernel K by performing incremental QR decompositions, which may transform the inversion of the covariance kernel K into the inversion of an upper-triangular matrix $(K^{-1}=R^{-1}Q^T)$. In some example embodiments, the inversion of the upper triangular matrix $(K^{-1}=R^{-1}Q^T)$ may be accomplished via back-substitution.

For example, solving for $V=K^{-1}B$ may require determining a vector V such that $RV=Q^T B$. That R may be an upper-triangular matrix as expressed by Equation (9) below may enable V to be determined via back-substitution. Back-substitution may refer to an technique for solving a linear system of equations (e.g., $RV=Q^T B$) having an upper-triangular coefficient matrix (e.g., the upper triangular matrix R). It should be appreciated that back-substitution may include iteratively solving for the linear systems equations $RV=Q^T B$ starting at the bottom row of the upper-triangular coefficient matrix. The equation formed from the bottom row of the upper-triangular coefficient matrix R may be solved first before that solution is back substituted into the equation formed from the next row of the upper-triangular coefficient matrix R to solve for that equation. This process may be repeated until the last equation formed from the top row of the upper-triangular coefficient matrix R is solved by back-substituting in the solution for the equation formed from the previous row of the upper-triangular coefficient matrix R.

$$R = \begin{bmatrix} R_{00} & R_{01} & R_{02} & R_{03} \\ 0 & R_{11} & R_{12} & R_{13} \\ 0 & 0 & R_{22} & R_{23} \\ 0 & 0 & 0 & R_{33} \end{bmatrix} \quad (9)$$

Figure 5A:
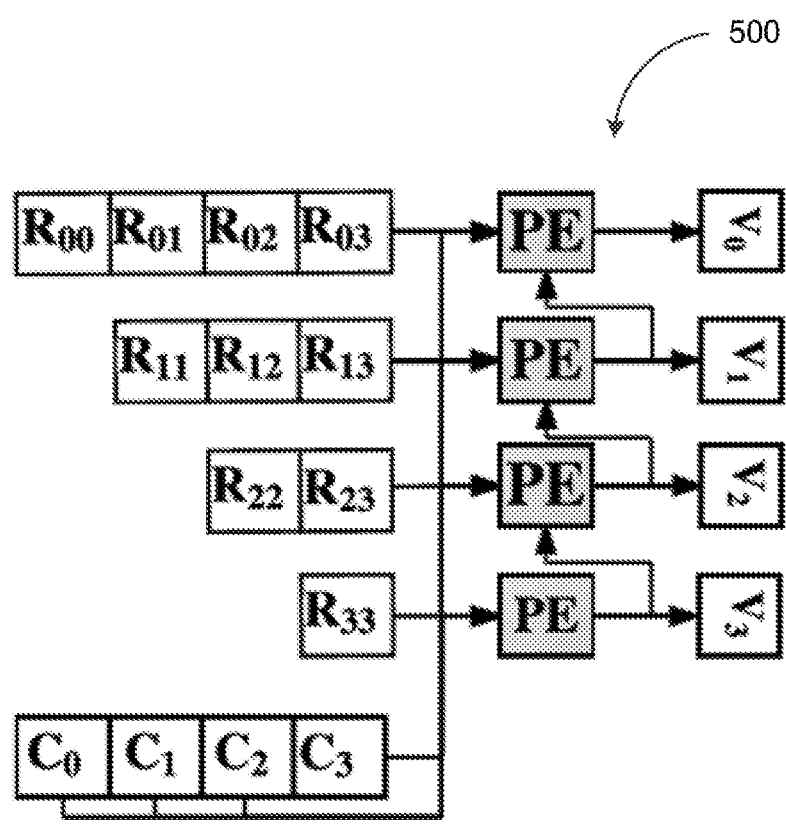
FIG. 5A depicts a block diagram illustrating a back substituter, in accordance with some example embodiments.
Figure 5B:
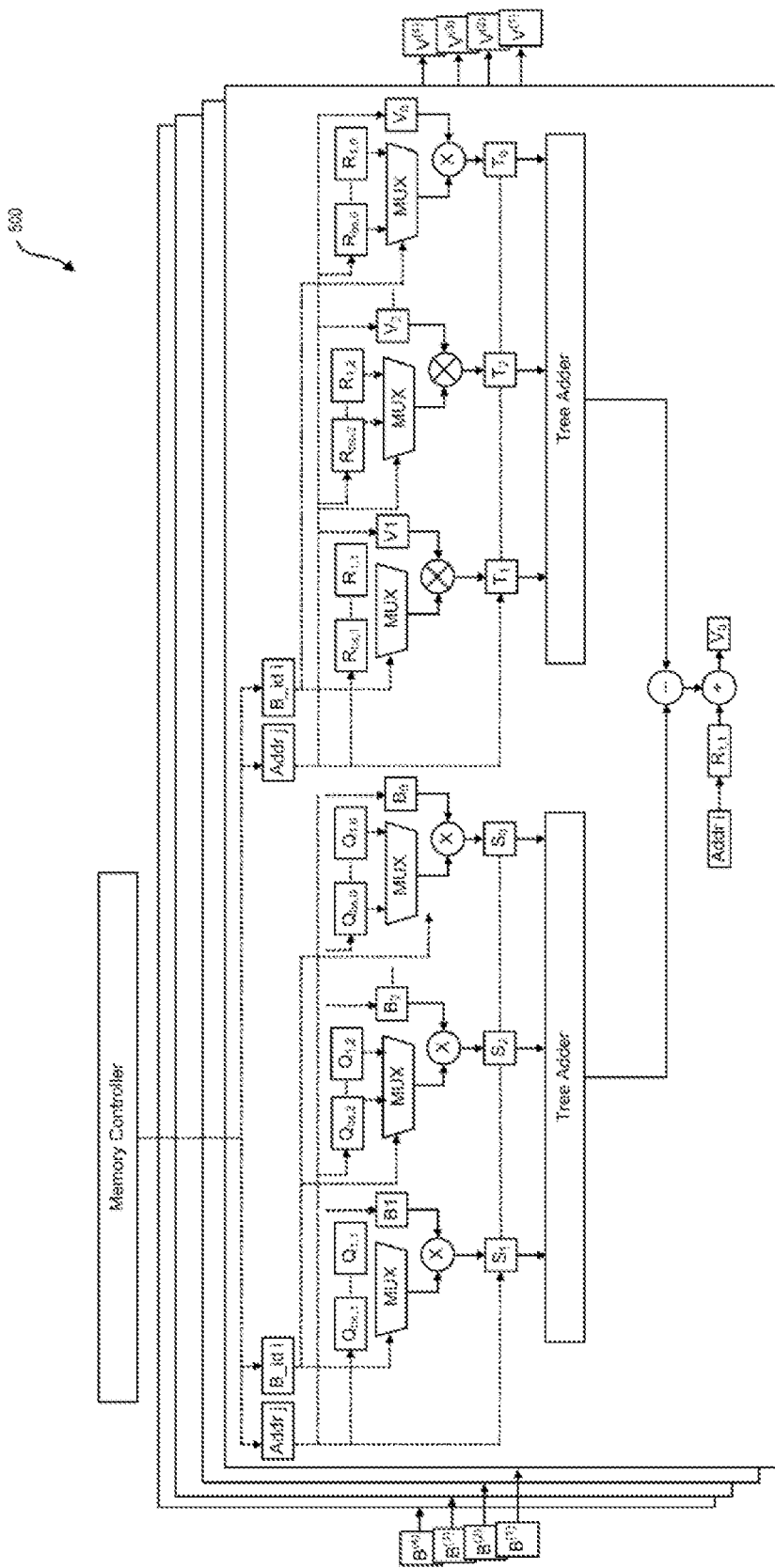
FIG. 5B depicts a schematic diagram illustrating a back substituter, in accordance with some example embodiments.

To further illustrate, FIG. 5A depicts a block diagram illustrating a back substituter 500, in accordance with some example embodiments. Meanwhile, FIG. 5B depicts a schematic diagram illustrating the back substituter 500, in accordance with some example embodiments. In some example embodiments, the hardware accelerator 160 may include the back substituter 500 for computing the inverse of the covariance kernel K.

Referring to FIG. 5A, the back substituter 500 may include a plurality of processing elements (PEs), which may be multiply-add accumulators configured to determine each element $V_i$ of the vector V by at least computing the following Equation (10), wherein the array C may denote the product $Q^T B$.

$$V_i = \frac{c_i - \sum_{j=i+1}^{b_s} R_{ij} V_j}{R_{ii}} \quad (10)$$

In some example embodiments, the hardware accelerator 160 may compute $RV = Q^T B$ across the individual batches of data samples included in the input data 170. For example, Equation (11) below may denote the computation of $RV = Q^T B$ for a matrix containing a batch of data samples having the batch size $b_s$.

$$R_{b_s \times b_s} V_{b_s \times b_s} = Q_{b_s \times b_s}{}^T B_{b_s \times b_s} \quad (11)$$

The hardware accelerator 160 may, in some example embodiments, compute $R_{b_s \times b_s} V_{b_s \times b_s}$ and $Q_{b_s \times b_s}{}^T B_{b_s \times b_s}$ in parallel. This parallelism may be achieved, for example, via the hardware implementation of the back substituter 500 shown in FIG. 5B.

Figure 6:
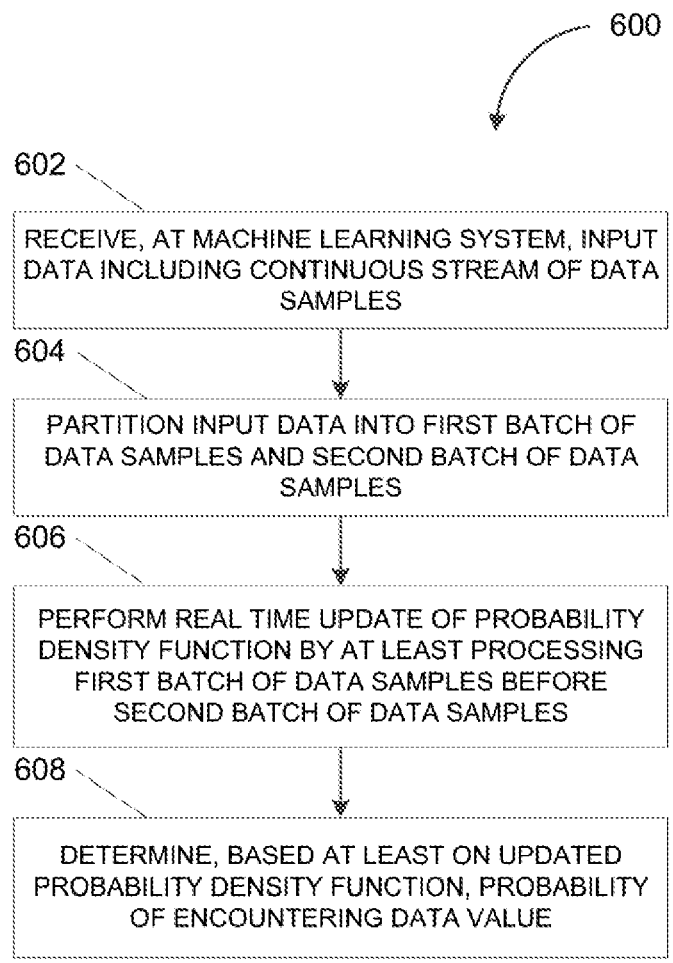
FIG. 6 depicts a flowchart illustrating a process for performing executing a machine learning model, in accordance with some example embodiments.

FIG. 6 depicts a flowchart illustrating a process 600 for executing a machine learning model, in accordance with some example embodiments. Referring to FIGS. 1-6, the process 600 may be performed by the machine learning system 100 in order to implement a probabilistic machine learning model including, for example, a Bayesian network, a belief network, and/or the like.

At 602, the machine learning system 100 may receive the input data 170 including a continuous stream of data samples. For example, in some example embodiments, the input data 170 may be a continuous stream of data samples that evolves over time. In order to support real time applications, the machine learning system 100 may be configured to generate the output 190 at the same time and/or substantially at the same time as the machine learning system 100 is being trained based on new data samples added to the input data 170. According to some example embodiments, the machine learning system 100 may implement a probabilistic machine learning model including a Bayesian network, a belief network, and/or the like. As such, the output 190 may include a probability of encountering a particular data value y* in the future based on the continuous stream of data samples included in the input data 170.

At 604, the machine learning system 100 may partition the input data 170 into a first batch of data samples and a second batch of data samples. In some example embodiments, the machine learning system 100 may include the hardware accelerator 160, which may impose one or more resource constraints including, for example, a runtime constraint $T_u$, a memory constraint $M_u$, a power constraint $P_u$, and/or the like. The resource constraints associated with the hardware accelerator 160 may prevent the machine learning system 100 from processing all of the input data 170 at once. As such, according to some example embodiments, the machine learning system 100 may partition the input data 170 into multiple batches of data samples. For example, the input data 170 may be partitioned horizontally and/or vertically such that each batch of data includes some but not all of the features and/or data samples included in the input data 170. Furthermore, each batch of data samples may be associated with the batch size $b_s$, which may be determined to maximize the throughput and/or resource utilization at the hardware accelerator 160.

At 606, the machine learning system 100 may perform a real time update of the probability density function 185A by at least processing the first batch of data samples before processing the second batch of data samples. As noted, the hardware accelerator 160 may process the input data 170 by at least updating the probability density function 185A based on the input data 170. Furthermore, it should be appreciated that the real time updating of the probability density function 185A may refer to an updating of the probability density function 185A that is performed in parallel and/or substantially in parallel as the generation of an output based on the probability density function 185A. Due to the resource constraints of the hardware accelerator 160, the hardware accelerator 160 may update the probability density function 185A based on one batch of data samples from the input data 170 before the hardware accelerator 160 updates the probability density function 185A based on another batch of data samples from the input data 170. In doing so, the hardware accelerator 160 may update the probability density function 185A by at least iteratively updating the set of hyperparameters θ associated with the probability density function 185A.

At 608, the machine learning system 100 may determine, based at least on the probability density function 185, a probability of encountering a data value. As noted, the probability density function 185A may be used, for example, by the output generator 185B, to generate the output 190. The output 190 may include a prediction of the probability of encountering the data value y* in the future given the continuous stream of data samples included in the input data 170. In some example embodiments, the updating of the probability density function 185A may be performed in real time. That is, the probability density function 185A may be updated, for example, at operation 608, at a same time and/or substantially at the same time as the determination of the probability of encountering the data value y* based on the probability density function 185A.

Figure 7:
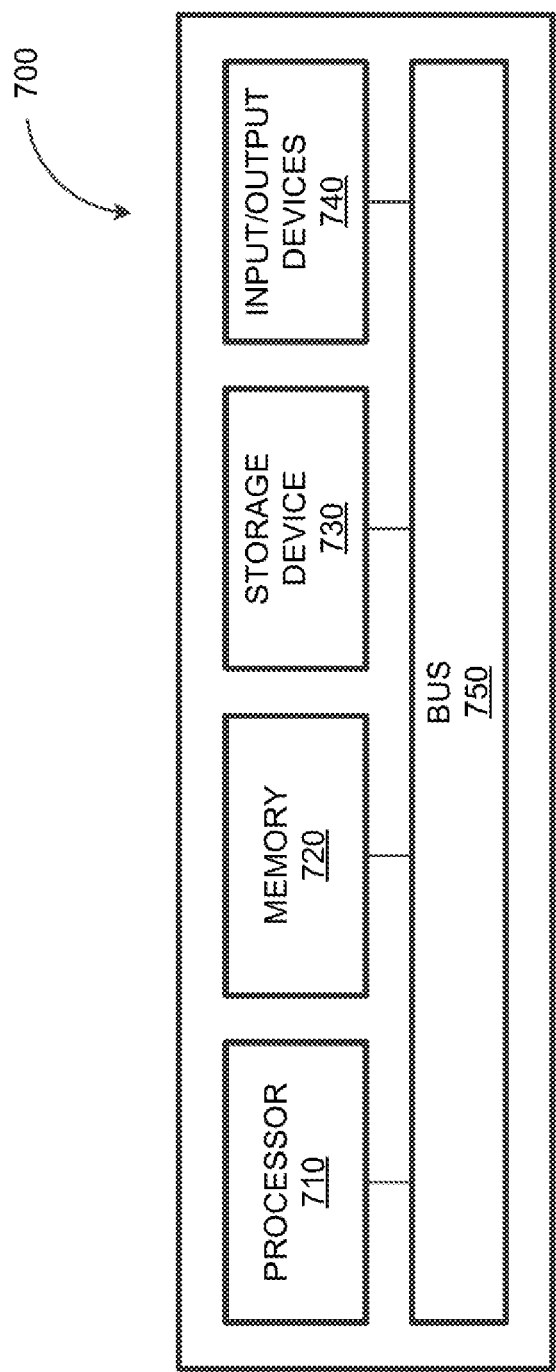
FIG. 7 depicts a block diagram illustrating a computing system, in accordance with some example embodiments.

FIG. 7 depicts a block diagram illustrating a computing system 700, in accordance with some example embodiments. Referring to FIGS. 1 and 5, the computing system 700 can be used to implement the global machine learning engine 110, the machine learning controller 130, the first client device 140, and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the global machine learning engine 110, the machine learning controller 130, and/or the first client device 140. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
   partitioning, into a first batch of data and a second batch of data, an input data received at a hardware accelerator implementing a machine learning model, the input data comprising a continuous stream of data samples, and the input data being partitioned based at least on a resource constraint of the hardware accelerator;

training the machine learning model by at least performing a real time update of a probability density function associated with the machine learning model, the probability density function including a predictive function associated with a mean and a covariance of a prior distribution of the input data indicative of a probability of encountering a data value without taking into account the first batch of data and the second batch of data, the probability density function being updated by at least processing, by the hardware accelerator, the first batch of data before the second batch of data; and applying the machine learning model in parallel with the training of the machine learning model, the machine learning model being applied to generate, based at least on the updated probability density function, an output comprising a first probability of encountering the data value given the first batch of data followed by a second probability of encountering the data value given the second batch of data.

2. The system of claim 1, wherein the probability density function is updated in real time such that the updating of the probability density function is performed at a same time and/or substantially at the same time as the generation of the output comprising the probability of encountering the data value.

3. The system of claim 1, wherein each data sample comprises a plurality of data values corresponding to a plurality of features, and wherein the first batch of data and the second batch of data each comprise some but not all of the plurality of features.

4. The system of claim 1, wherein the first batch of data and the second batch of data each comprise some but not all of the data samples included in the input data.

5. The system of claim 1, wherein the machine learning model comprises a probabilistic machine learning model configured to perform an inference task.

6. The system of claim 5, wherein the probabilistic machine learning model comprises a Bayesian network and/or a belief network.

7. The system of claim 1, wherein the hardware accelerator processes the first batch of data and/or the second batch of data by at least applying, to the first batch of data and/or the second batch of data, one or more Markov Chain Monte Carlo techniques.

8. The system of claim 7, wherein the first batch of data and/or the second batch of data each comprise a matrix, and wherein the application of the one or more Markov Chain Monte Carlo techniques includes performing a sequence of dot product operations between two or more matrices comprising the first batch of data and/or the second batch of data.

9. The system of claim 8, wherein the hardware accelerator includes a tree adder configured to perform the sequence of dot product operations by at least performing, in parallel, at least a portion of a plurality of addition operations and/or multiplication operations comprising the sequence of dot product operations.

10. The system of claim 1, wherein the hardware accelerator comprises one or more application specific integrated circuits (ASICs) and/or field programmable gate arrays (FPGAs).

11. The system of claim 10, wherein the update to the probability density function comprises updating, based at least on the first batch of data and/or the second batch of data, the mean and/or the covariance of the prior distribution.

12. The system of claim 1, wherein the update to the probability density function further comprises determining, based at least on the prior distribution, a gradient of a posterior distribution of the input data, and wherein the posterior distribution of the input data indicates the probability of encountering the data value given the first batch of data and/or the second batch of data.

13. The system of claim 12, wherein the determination of the gradient includes computing an inverse of a covariance matrix corresponding to the covariance of the prior distribution, wherein the inverse of the covariance matrix is computed by at least performing a plurality of QR decompositions, and wherein the plurality of QR decompositions are performed to compute an inverse of an upper triangular matrix R.

14. The system of claim 13, wherein the hardware accelerator is configured to compute the inverse of the upper triangular matrix R by at least performing back-substitution.

15. The system of claim 1, wherein the partitioning of the input data is further based at least on a dimensionality of the input data and/or a rate at which the input data is received at the hardware accelerator.

16. The system of claim 1, further comprising:
dividing, into a first portion of data and a second portion of data, the first batch of data; and
storing the first portion of data and the second portion of data in different memory blocks to at least enable the first portion of data and the second portion of data to be accessed simultaneously for processing by the hardware accelerator during the update of the probability density function.

17. A computer-implemented method, comprising:
partitioning, into a first batch of data and a second batch of data, an input data received at a hardware accelerator implementing a machine learning model, the input data comprising a continuous stream of data samples, and the input data being partitioned based at least on a resource constraint of the hardware accelerator;
training the machine learning model by at least performing a real time update of a probability density function associated with the machine learning model, the probability density function including a predictive function associated with a mean and a covariance of a prior distribution of the input data indicative of a probability of encountering a data value without taking into account the first batch of data and the second batch of data, the probability density function being updated by at least processing, by the hardware accelerator, the first batch of data before the second batch of data; and
applying the machine learning model in parallel with the training of the machine learning model, the machine learning model being applied to generate, based at least on the updated probability density function, an output comprising a first probability of encountering the data value given the first batch of data followed by a second probability of encountering the data value given the second batch of data.

18. A non-transitory computer readable medium storing instructions, which when executed by at least one data processor, result in operations comprising:
partitioning, into a first batch of data and a second batch of data, an input data received at a hardware accelerator implementing a machine learning model, the input data comprising a continuous stream of data samples, and the input data being partitioned based at least on a resource constraint of the hardware accelerator;

training the machine learning model by at least performing a real time update of a probability density function associated with the machine learning model, the probability density function including a predictive function associated with a mean and a covariance of a prior distribution of the input data indicative of a probability of encountering a data value without taking into account the first batch of data and the second batch of data, the probability density function being updated by at least processing, by the hardware accelerator, the first batch of data before the second batch of data; and applying the machine learning model in parallel with the training of the machine learning model, the machine learning model being applied to generate, based at least on the updated probability density function, an output comprising a first probability of encountering the data value given the first batch of data followed by a second probability of encountering the data value given the second batch of data.

* * * * *